No. 701,844. Patented June 10, 1902.
E. P. CLAPP.
WEEDER ATTACHMENT FOR CULTIVATORS.
(Application filed Dec. 14, 1901.)
(No Model.) 2 Sheets—Sheet 1.
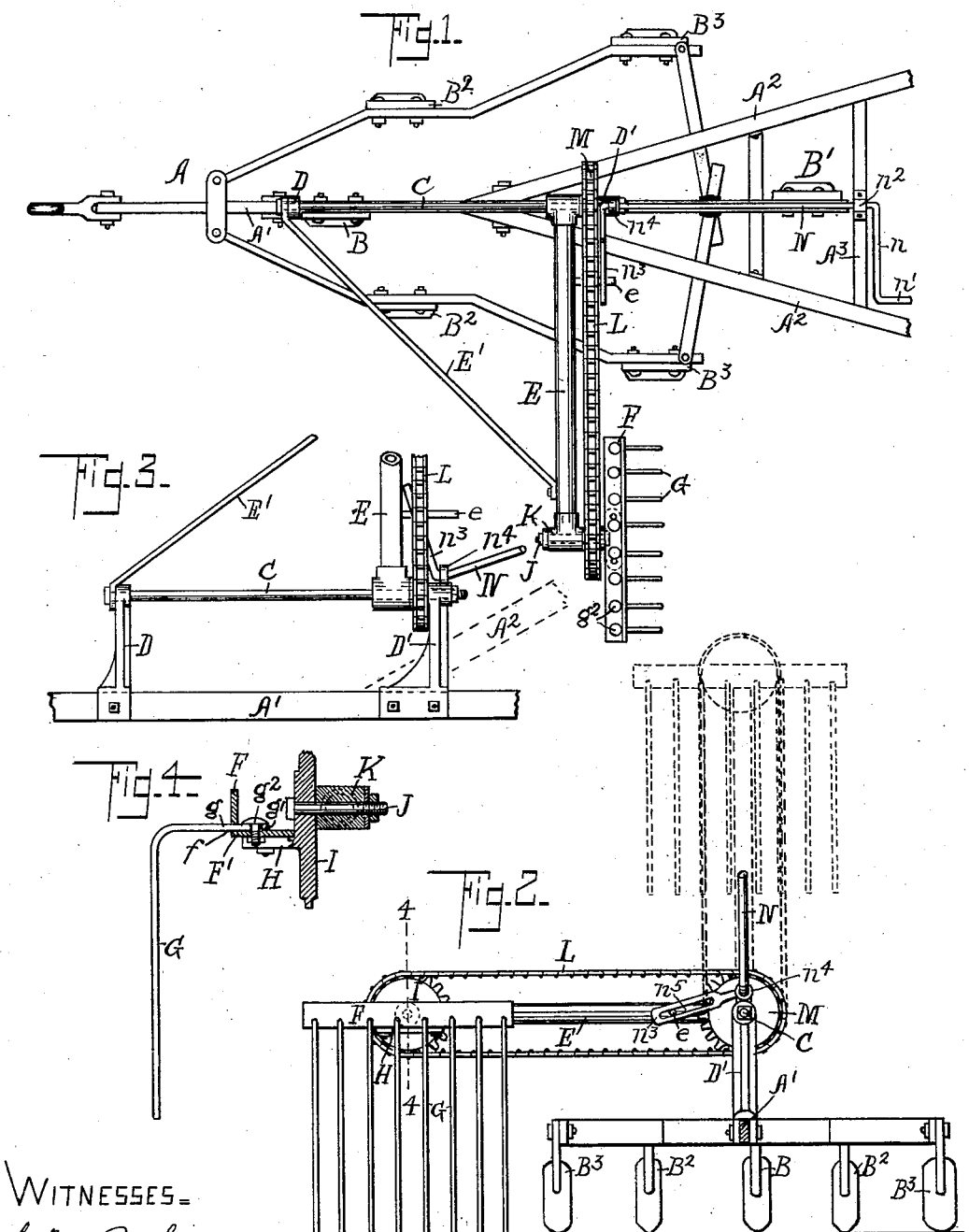

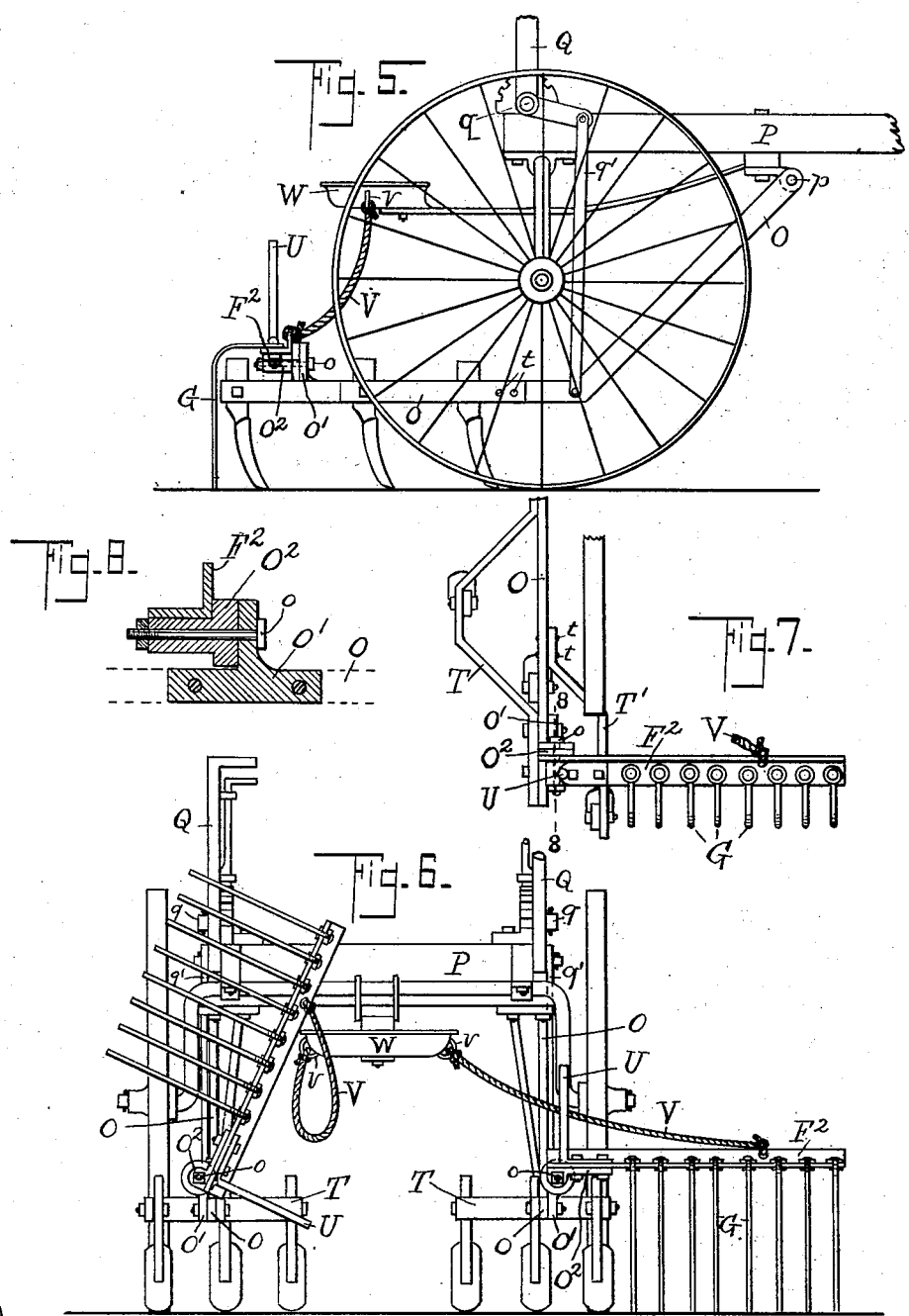

UNITED STATES PATENT OFFICE.

EDWIN P. CLAPP, OF NORTH RUSH, NEW YORK.

WEEDER ATTACHMENT FOR CULTIVATORS.

SPECIFICATION forming part of Letters Patent No. 701,844, dated June 10, 1902.

Application filed December 14, 1901. Serial No. 85,913. (No model.)

*To all whom it may concern:*

Be it known that I, EDWIN P. CLAPP, a citizen of the United States, and a resident of North Rush, in the county of Monroe and State of New York, have invented certain new and useful Improvements in Weeder Attachments for Cultivators and Like Agricultural Implements, of which the following is a specification.

This invention relates to weeder attachments for cultivators, and has for its object to provide a weeder in connection with a cultivator.

The novel features of the invention will be particularly set forth in the specification and claims.

Referring to the accompanying drawings, Figure 1 is a top view of a cultivator embodying the invention. Fig. 2 is a rear view of a portion of the cultivator, the dotted lines showing the weeder attachment as it is being reversed. Fig. 3 is a side view from the left of certain parts of the cultivator. Fig. 4 is a section on the line 4 4 of Fig. 2, enlarged. Fig. 5 is a side elevation of another form of the weeder attachment applied to a cultivator of another form. Fig. 6 is a rear view of the same weeder attachment and cultivator shown in Fig. 5, and Fig. 7 is a view from above of parts of the weeder attachment and cultivator shown in the two figures last referred to. Fig. 8 is a section on the line 8 8 of Fig. 7.

The frame of the cultivator, which may be of any suitable construction, is represented as composed of the frame A, consisting of several rails suitably fastened together, a suitable central beam A', rigidly connected therewith, and the handle-bars $A^2 A^2$, secured to the frame at any convenient point. The beam A' carries the cultivator-teeth B B', and the side rails each carry one of the pairs of teeth $B^2 B^2$ and $B^3 B^3$. A bar C is supported above the central beam A', as by the standards D D', (see Fig. 3,) and the weeder is carried by an arm E, which is pivoted upon the bar C, as shown in Figs. 1 and 2. The weeder consists of the frame F and the teeth G, secured thereto in any suitable manner. In Fig. 4 is shown the preferred way for attaching these teeth G to the frame F. By referring to said figures it will be seen that the teeth are bent at right angles and that their upper ends $g$ are passed through holes $f$ in the frame F and are finished in loops $g'$. Each tooth is secured to the part F' of the frame by a bolt $g^2$, which is passed through said loop and frame and secured by a nut. The frame F is in turn secured to an arm H, which projects rearwardly from the sprocket-wheel I, and the latter is pivotally secured to the arm E by the bolt J, which passes through a bracket K upon the end of the arm E. (See Fig. 4.) Another sprocket-wheel M is rigidly secured to the cultivator, as at the bracket D', in the same plane with the sprocket-wheel I, and an endless chain L connects the two wheels.

The means whereby the arm E and the weeder are respectively rotated is as follows: A rod N, one end of which is bent into a crank $n$ and handle $n'$ and the other end of which, $n^3$, is bent at an angle with the main portion of the arm, is journaled at $n^2$ and $n^4$ upon one of the braces $A^3$ for the handle-bar $A^2$ and on the bracket D', respectively. The end $n^3$ of the said rod N is slotted, as shown by $n^5$ in Fig. 2, so as to contain a pin $e$, that projects from the arm E. When the crank end $n$ of the rod N is turned, the arm E is raised by it into the position shown by dotted lines in Fig. 2, and from that position it may be dropped to the other side of the cultivator. As the arm E is raised in the manner described the sprocket-wheel I is caused to rotate, because of its connection through the chain L with the rigid sprocket-wheel M, and the weeder, because of its rigid connection with the said sprocket-wheel I, is caused to rotate with reference to the said arm E. The relative size of the sprocket-wheels I and M is such that when the arm E is transferred from its normal position on one side of the cultivator to its normal position on the other side the weeder will have its upright position, in which the teeth are vertical in both positions. The positions of the frame F and the teeth G of the weeder when the arm E is raised at right angles to its normal position are shown by dotted lines in Fig. 2. The weight of the weeder would cause it to retain its said normal vertical position at all times even if the said sprocket-wheel I was not connected by the chain L with the rigid sprocket-wheel M, as described above; but the said connection affords a positive means by which the vertical position of the weeder is assured. A sliding connection, such as the slot $n^5$ in the end $n^3$ of the rod N and the pin $e$, is essential between the arm E and the rod N when the latter is placed at an angle to the former, as shown in the drawings, for the reason that the point of engagement between said parts changes when the arm E is rotated. The arm E may be braced in any suitable manner, as by the brace E'.

The operation of the weeder described above is now obvious. When the cultivator is used between rows of plants, the weeder (assuming that it is in the position with reference to the cultivator in which it is represented in the drawings) will uncover the row of plants on the left of the cultivator and destroy any small weeds that may be there. At the same time the weeder levels the rows. When the cultivator is to be run back in the opposite direction in the space between the row of plants that was on its right during said first operation and the next row, the arm E is turned over to the other side of the cultivator by the rod N, and with it the weeder, which will assume a position on the right of the cultivator corresponding to that which it before occupied on the left. The weeder will now weed and level the next row of plants, which is that on the right of the cultivator. In this way by reversing the position of the weeder at the end of each row the several rows of plants in a field will be weeded and leveled successively. The operator is thus enabled to weed and level successively all of the rows of plants without running his cultivator over the same ground twice and without stopping it to adjust the weeder.

In Figs. 5 to 7, inclusive, the weeder is represented as attached to a sulky-cultivator. The cultivator-teeth are carried by the bars O O, which are respectively pivoted to the frame P, as at $p$ $p$. The teeth are raised by means of levers Q Q, which are respectively pivoted to the sulky-frame, as at $q$ $q$, and the connecting-rod $q'$ $q'$ or by other suitable means. The teeth G of the weeder are represented as attached to the frames $F^2$ $F^2$ in the manner described with reference to the form of weeder first described, and the frames $F^2$ $F^2$ are rigidly secured to castings $O^2$ $O^2$, respectively, which are in turn pivotally secured to brackets O' O', respectively, as by the bolts $o$ $o$. The brackets are rigidly secured to the bars O O, respectively. T T are corresponding parts of the cultivator-frame that carry cultivator-teeth and are secured to the other bar O O, as by the bolt $t$ $t$. The bars O O and T T are extended back, as shown in Fig. 7, and afford a seat for the weeders when they are not in use and tilted back into the position shown in Fig. 6. T' T' represent other bars of the cultivator that carry one or more of its teeth. Handles U U afford one means of elevating the weeder-frames. Other means may be employed—as, for example, ropes V V, which are secured to the frame $F^2$ $F^2$ of the weeders, or both handles and ropes may be employed to advantage, for in some positions of the weeders the ropes can be used to raise or lower the weeders when the handles are not convenient therefor. The upper ends of the ropes V V are represented as attached to the driver's seat W, as at $v$ $v$.

What I claim is—

1. The combination with a cultivator of a weeder; a support for the weeder, adapted to carry the weeder on either side of the cultivator, and means whereby the weeder is caused to assume its operative position on either side of the cultivator.

2. The combination with a cultivator of a weeder; a support for the weeder adapted to carry the weeder on either side of the cultivator; and means for attaching the weeder to its support, whereby the weeder is caused to assume its operative position on either side of the cultivator.

3. The combination with a cultivator of a weeder; a support for the weeder adapted to carry the weeder on either side of the cultivator; means whereby the weeder is caused to assume its operative position on either side of the cultivator; and means for transferring the weeder from one side of the cultivator to the other.

4. The combination with a cultivator of a weeder; a support for the weeder on one side of the cultivator and movably attached thereto; means for attaching the weeder to its support, whereby the weeder is adapted to assume its operative position on either side of the cultivator; and means for moving the support from one side of the cultivator to the other.

5. The combination with a cultivator of a weeder; a support for the weeder adapted to carry the weeder on either side of the cultivator; and means for pivotally attaching the weeder to its support, whereby the weight of the weeder will cause it to assume automatically an operative position when the support is on either side of the cultivator.

6. The combination with a cultivator of a weeder; a support for the weeder, adapted to transfer the weeder from one side of the cultivator to the other; means for revolubly attaching the weeder to the support; and means for connecting the weeder with the cultivator, whereby said weeder is caused to assume an operative position on either side of the cultivator.

7. The combination with a cultivator of a weeder; a support for the weeder, adapted to transfer the weeder from one side of the cultivator to the other; means for pivotally attaching the weeder to its support, whereby its own weight will cause it to assume an operative position on either side of the cultivator; and means for connecting the weeder with the cultivator, whereby said weeder is caused positively to assume an operative position on either side of the cultivator.

8. The combination with a cultivator of a weeder; the arm E revolubly attached to the cultivator; means for pivotally attaching the weeder to the arm E whereby the weeder is caused to assume automatically an operative position on either side of said cultivator; and means for transferring the arm E from one side of the cultivator to the other.

9. The combination with a cultivator of a weeder; the arm E revolubly attached to the cultivator; a support for the weeder revolubly secured to the arm E; and means for connecting said support with the cultivator, whereby the weeder is caused to assume an operative position on either side of the cultivator.

10. The combination with a cultivator of a weeder; the arm E revolubly attached to the cultivator; the sprocket-wheel I pivotally attached thereto; means for connecting the weeder with the sprocket-wheel I; the sprocket-wheel M, rigidly secured to a part of the cultivator; and the chain L connecting said sprocket-wheels.

11. The combination with a cultivator of a weeder; the arm E, revolubly attached to the cultivator; the sprocket-wheel I, pivotally attached thereto; means for connecting the weeder with the sprocket-wheel I; the sprocket-wheel M, rigidly secured to a part of the cultivator; the chain L connecting said sprocket-wheels; and means for transferring the weeder from one side of the cultivator to the other.

12. The combination with a cultivator of a weeder; the arm E, revolubly attached to the cultivator; the sprocket-wheel I, pivotally attached thereto; means for connecting the weeder with the sprocket-wheel I; the sprocket-wheel M, rigidly secured to a part of the cultivator; the chain L, connecting said sprocket-wheels; the rod N, revolubly supported upon the cultivator; and a sliding connection between the arm E and said rod N.

13. The combination with a cultivator having the central beam A', of a weeder; the revoluble arm E supported by said central beam A'; means for pivotally connecting the weeder to the arm E; and means for transferring the weeder from one side of the cultivator to the other.

EDWIN P. CLAPP.

Witnesses:
C. M. PERKINS,
F. BISSELL.